US007083332B2

United States Patent
Mukouda

(10) Patent No.: US 7,083,332 B2
(45) Date of Patent: Aug. 1, 2006

(54) CONNECTOR COMPONENT FOR MULTI-CORE OPTICAL FIBER, FERRULE, AND METHOD FOR MANUFACTURING THE SAME

(76) Inventor: Takahiko Mukouda, 6-6, Minowa 1-chome, Taito-ku, Tokyo 110-0011 (JP)

( * ) Notice: Subject to any disclaimer, the term of this patent is extended or adjusted under 35 U.S.C. 154(b) by 231 days.

(21) Appl. No.: 10/250,915

(22) PCT Filed: Aug. 13, 2001

(86) PCT No.: PCT/JP01/06989

§ 371 (c)(1), (2), (4) Date: Jul. 8, 2003

(87) PCT Pub. No.: WO02/056079

PCT Pub. Date: Jul. 18, 2002

(65) Prior Publication Data

US 2004/0037510 A1 Feb. 26, 2004

(30) Foreign Application Priority Data

Jan. 9, 2001 (JP) ............................. 2001-001947
Jul. 31, 2001 (JP) ............................. 2001-232798

(51) Int. Cl.
*G02B 6/36* (2006.01)
*C25D 1/02* (2006.01)

(52) U.S. Cl. ........................... 385/71; 385/59; 385/72; 205/73

(58) Field of Classification Search ................ 385/59, 385/60, 66–68, 71, 72, 78, 84, 85; 205/73, 205/79
See application file for complete search history.

(56) References Cited

U.S. PATENT DOCUMENTS

| 1,535,400 | A | * | 4/1925 | Crowell | 205/73 |
| 4,326,928 | A | * | 4/1982 | Dugan | 205/73 |
| 5,048,917 | A | * | 9/1991 | Komatsu | 385/78 |
| 2002/0146214 | A1 | * | 10/2002 | Tanaka et al. | 385/78 |

FOREIGN PATENT DOCUMENTS

| DE | 19956974 A1 | 6/2000 |
| JP | 60-208466 A | 10/1985 |
| JP | 62-222210 A | 9/1987 |
| JP | 64-68492 A | 3/1989 |
| JP | 4-30496 A | 2/1992 |
| JP | 5-93824 A | 4/1993 |
| JP | 2000-292651 A | 10/2000 |

* cited by examiner

*Primary Examiner*—Sarah Song
(74) *Attorney, Agent, or Firm*—Lowe Hauptman & Berner, LLP

(57) ABSTRACT

The objective is to offer a connector component for multi-core optical fiber, or an assembly of ferrules, having high precision ferrules in concentricity, circularity, axial linearity, and spacing distance, as well as to offer a method of manufacturing the same at a reduced cost. The connector (or ferrules) is featured by its manufacturing method including thermal-spraying or electroforming is applied, using a resin or a metal, to a plurality of cylinder-shaped ferrules, under the condition that projections which are positioned opposite each other of a positioning member are fitted and nipped to both ends of insertion holes of the cylinder-shaped ferrules so that each ferrule is properly positioned and the central axes are parallel to each other at specified positions so that the plurality of cylinder-shaped ferrules are coated.

9 Claims, 13 Drawing Sheets

CONNECTOR COMPONENT FOR MULTI-CORE OPTICAL FIBER, FERRULE, AND METHOD FOR MANUFACTURING THE SAME

DETAILED DESCRIPTION OF THE INVENTION

1. Field of the Invention

The present invention relates to a connector used to connect multi-core optical fibers, and more particularly to (a) a connector wherein the connection ends of the linked optical fibers are arranged in a two-dimensional manner, and (b) a method of manufacturing said connector.

2. Description of the Related Art

Recently, a communication means using optical-fiber cable has been developed for transmitting and receiving a large volume of diverse information at one time, and the demand for optical connectors to connect various pieces of equipment, devices, and optical-circuit parts in optical-communications systems or optical-application measuring systems has been increasing.

Optical fiber is mainly composed of quartz glass, and it consists of a core part, to which light power is concentrated, and a clad part that confines the light power. Because the age of multimedia has begun, optical fibers are being used in a variety of fields that use optical elements, such as telephone lines. Before being used, an optical fiber is usually cut to an appropriate length corresponding to its usage, and its ends are finished as connectors. Usually, when making the ends of optical fibers into connectors, either (a) cylindrical ferrules are used to hold the optical-fiber wires together coaxially or (b) multi-core ferrules—wherein optical fibers are placed in V-shaped grooves on a resin-formed material, and directly coated with resin-formed covers—are used.

Conventionally, optical fibers are connected one by one, i.e., each pair of optical fibers was connected by one connector. At present, however, there is a growing tendency toward using multi-core and high-density optical-fiber cables, and multi-core optical connectors have been developed so that these multi-core and high-density optical fibers can be connected all together in order to transmit an even greater amount of data.

A multi-core connector is a connector for connecting plural optical fibers simultaneously. The connecting style and the basic constitution of a multi-core connector are the same as those of a single-core optical connector. Multi-core connectors can be classified into the following two types, depending on the fibers' location and alignment: (1) independent-ferrule-type multi-core optical connectors, in which a ferrule for a single core is used for each core of a multi-core fiber and a group of single-core ferrules constitute an optical connector; (2) batch-arrangement-type optical connectors, in which plural optical fibers are fixed in V-shaped grooves on the surface of a substrate so that the optical fibers can be connected. Plural holes into which optical fibers are to be inserted are made on a square-shaped ferrule so as to form a multi-core ferrule, so that the end faces of the optical fibers can be connected easily by a guide pin.

Optical fiber is composed mainly of glass quartz and consists of a core part, to which light power is concentrated, and a clad part that confines the light power. Because the age of multimedia has begun, optical fibers are being used in a variety of fields that use optical elements, such as telephone lines. Before being used, an optical fiber is usually cut into an appropriate length corresponding to its usage, and its ends are finished in such a way that its ends can function as connectors. Cylindrical ferrules are usually used to hold the optical-fiber wires together coaxially when the ends of optical fibers are made into connectors.

Because the independent-ferrule-type multi-core optical connector's method of connecting optical fibers is basically the same as that of a single-core connector, its connection performance is as good as that of a single-core connector. However, as the number of cores of the optical fiber increases, each ferrule has to be arranged in a coaxial circle or in rows, which requires the connector to have a large outer shape. Therefore, from an operational point of view, an independent-ferrule-type multi-core optical connector can be applied only for fibers having comparatively few cores—10 or less.

In addition, said batch-arrangement-type optical connector has the advantage that it enables a large number of optical fibers to be connected at high density. However, if the dimensional accuracy of the members that constitute this connector is not controlled strictly, the end faces of each fiber can cause displacement, resulting in bad connections. Therefore, it has been impossible to use the above type of optical connector in constructing a system with a large optical-transmission path that has, for example, 1,000 channels.

Conventionally, said ferrules are manufactured as follows: A mixture of zirconia powder and resin is formed into a cylindrical shape by injection molding or extrusion molding, and sintered at around 500° C. to decompose resin. After said mixture that is formed into a cylindrical shape is further sintered at around 1,200° C., a diamond is used to grind insertion holes into said sintered mixture so as to finely adjust the diameters of the insertion holes, and the insertion holes are machined in such a way that the outer periphery of the sinter becomes a perfect circle. However, such a manufacturing method has the following problems:

(1) Because an expensive molding machine and a metallic mold are required for injection molding or protrusion molding, and because a metallic mold is susceptible to abrasion due to zirconia powder, the molding machine or the metallic mold must be constantly maintained or exchanged.

(2) Because labor and special skills are required to use a diamond to grind the insertion holes, it is difficult to increase productivity.

(3) Sintering at a high temperature requires much energy at enormous cost.

(4) It is substantially impossible to create a plurality of insertion holes—into which optical fiber wires are to be inserted—on a sinter that is made of ceramics such as zirconia.

(5) Although the end surface of a sinter must be processed into a convex spherical face, a slant convex spherical face, a flat face, a slant face and the like, so that said sinter can match a physical-contact connection, such processing on a sinter made of ceramics is difficult.

As a means of solving the above-mentioned problems, "a method for manufacturing ferrules, which includes a step for electrodepositing metal around the core wires by electroforming to form a cylindrical material, and a step for removing the core wires from the cylindrical material, has been proposed in PCT/JP99/06570 publication (title of the invention: "OPTICAL FIBER CONNECTOR AND FERRULE USED FOR IT AND PRODUCTION METHOD FOR FERRULE").

However, according to this publication, because a connector for connecting optical fibers obtained by this manufacturing method (hereinafter referred to as a "ferrule") is comparatively thick (outside diameter=2 mm–3 mm), there are such problems that it is difficult to increase the mounting density of the optical fibers in the connector, and that, when grinding the outer periphery of the cylindrical material, it is difficult to restrain eccentricity within a predetermined range, as a result of which the yield of ferrule products tends to decrease. Another problem is that, because energization needs to be performed for about one day in order to obtain cylindrical material, which is the base material of ferrules, much time and energy, at high cost, must be devoted to manufacturing ferrules.

DISCLOSURE OF THE INVENTION

The present invention has been made for the purpose of solving the above problems. An invention described in claim 1 is a connector that is used to hold the terminals of plural optical fibers and that comprises (a) a main body consisting of a material formed by thermal-spraying, or consisting of electrodeposited layers, of either a resin or a metal, and (b) a plurality of cylindrical ferrules, into each of which each core of said plural optical fibers is inserted;

and with said connector characterized such that said ferrules are coated with said thermal-sprayed material or said electrodeposited layers under the condition that the central axes of the insertion holes in said ferrules are parallel to each other at specified positions.

An invention as described in claim 2 is a connector that is used to hold the terminals of plural optical fibers and that consists of (a) a main body consisting of a material formed by thermal-spraying, or consisting of electrodeposited layers, of either a resin or a metal, (b) a plurality of cylindrical ferrules, into each of which each core of said plural optical fibers is inserted;

and with said connector characterized such that (c) said ferrules are coated with said thermal-sprayed material or said electrodeposited layers under the condition that the central axes of the insertion holes in said ferrules are parallel to each other at specified positions, and that (d) the surface of said coated structure is further coated with at least one thermal-sprayed layer of a resin or a metal.

An invention as described in claim 3 is a connector, with said connector characterized such that (a) at least two of the connectors described in claim 1, which are formed into specified shapes, are piled up to multi layers, and that (b) the above-mentioned layers of connectors are further coated integrally with at least one thermal-sprayed layer of a resin or a metal, under the condition that the central axes of the insertion holes in said ferrules of said connectors are made to align with each other and held at specified positions.

An invention as described in claim 4 is a ferrule for a multi-core optical fiber as described in claims 1–3, and characterized by its comprising (a) a core wire made of a metallic pipe having insertion holes whose inside diameters are large enough for said optical fibers to be inserted therein, and (b) a metallic electrodeposited layer that has been electrodeposited onto the outer periphery of the core wire.

An invention as described in claim 5 is a ferrule for a multi-core optical fiber as described in claim 4, and characterized such that at least one end face thereof has a flat shape, a dome shape, or an angled shape.

An invention as described in claim 6 is a ferrule for a multi-core optical fiber as described in claim 4, and characterized such that at least one of said insertion holes is tapered backward.

An invention as described in claim 7 is a ferrule for a multi-core optical fiber as described in claim 4, and characterized such that the inside diameter of said core wire is 0.05 mm–0.13 mm.

An invention as described in claim 8 is a ferrule for a multi-core optical fiber as described in claim 4, and characterized such that a plurality of cylindrical ferrules are (a) held in a condition such that the central axes of the insertion holes of said ferrules are parallel to each other at a specified positions, and (b) electroformed using a metallic raw material, so that a plurality of said ferrules are integrally coated and molded.

One aspect of the invention is a method of manufacturing a connector, with the method wherein thermal-spraying or electroforming is applied—using a resin or a metal—to a plurality of cylinder-shaped ferrules, under the condition that projections, which are opposed to each other, of positioning members are fitted and nipped to both ends of the insertion holes of the cylinder-shaped ferrules so that each ferrule is properly positioned and so that the central axes are parallel to each other at specified positions, so that the plurality of cylinder-shaped ferrules are coated.

Yet another aspect of the invention is a method of manufacturing a connector, with the method wherein a connector manufactured is formed into a specified shape, and such that the surface—except both ends—of the connector is thermal-sprayed with at least one layer of a resin or a metal so as to form a coating on it.

Still another aspect of the invention is a method of manufacturing a connector, with the method wherein connectors manufactured are piled up in multiple layers in a specified shape, the central axes of the insertion holes in the ferrules fixed onto the connectors are parallel to each other at specified positions, and the surfaces—except both ends—of the connectors are thermal-sprayed with at least one layer of a resin or a metal so as to form a coating around said surfaces.

Another aspect of the invention is a method of manufacturing a connector for multi-core optical fibers with the method wherein a means for fixing ferrules at specified positions comprises a mobile positioning-member and a stationary positioning-member, both having projections to be engaged with the ends of the insertion holes in the ferrules, and the projections of both the mobile and stationary positioning-members are engaged with both end-holes of each ferrule so as to hold each ferrule so that each ferrule is positioned as desired.

Another aspect of the invention is a method of manufacturing a connector for multi-core optical fibers, with the method wherein a means for fixing ferrules at specified positions comprises a mobile positioning member and a stationary positioning member, both having projections to be engaged with the ends of the insertion holes in the ferrules, and the projections of both the mobile and stationary positioning members are engaged with both end-holes of each ferrule so as to hold each ferrule so that each ferrule is positioned as desired.

Another aspect of the invention is a method of manufacturing a connector with the method wherein thermal-spraying is performed by flame spraying or electric-arc spraying.

Another aspect of the invention is a method of manufacturing a ferrule for coupling optical fibers by an electroforming manner for applying electric current between an anode and a cathode that are dipped in an electroforming aqueous solution stored in an electroforming bath and arranged opposite each other, and for electrodepositing said anode substance on the surface of said cathode, a method of manufacturing a ferrule for a multi-core optical fiber characterized such that a core wire composed of a metallic pipe having insertion holes, whose inside diameters are suitable for optical fibers to be inserted thereinto, is used as said cathode, and an electrodeposited layer is formed on the outer periphery of the core wire.

Another aspect of the invention is a method of manufacturing a ferrule for a multi-core optical fiber wherein a step for cutting the outer periphery of the electrodeposited layer into a cylinder shape so as to manufacture a ferrule having the axial core of the core wire as the center of the ferrule.

Another aspect of the invention is a method of manufacturing a ferrule for a multi-core optical fiber wherein a step for moving the core wires and the electrodeposited layer in such a manner that the distance from the anode increases or decreases in the process of forming the electrodeposited layer onto the core wire, so as to improve the circularity or concentricity of the electrodeposited layer when manufacturing the ferrule.

Another aspect of the invention is a method of manufacturing a ferrule for a multi-core optical fiber wherein a step for rotating said core wire and the electrodeposited layer about their common axial core as a center in the process of forming an electrodeposited layer onto the core wire, so as to improve the circularity or concentricity of the electrodeposited layer when manufacturing the ferrule.

Another aspect of the invention is a method of manufacturing a ferrule for a multi-core optical fiber wherein the method includes a step—in the process of forming an electrodeposited layer on the core wire—whereby the anode is moved back and forth alternately in the vertical direction at high speed in a thick metal-electrodeposited portion of the electrodeposited layer and at low speed in a thin portion of the electrodeposited layer, so that the degree of tapering of the outer periphery of the electrodeposited layer is reduced in manufacturing the ferrule.

Another aspect of the invention is a method of manufacturing a ferrule for a multi-core optical fiber wherein a step for reciprocating the anode in the vertical direction at high speed at a thick metal-electrodeposited portion of the electrodeposited layer and at low speed at a thin portion of the electrodeposited layer in the process of forming an electrodeposited layer onto the core wire, so as to reduce the degree of tapering of the outer periphery of the electrodeposited layer when manufacturing the ferrule.

Another aspect of the invention is a method of manufacturing a ferrule for a multi-core optical fiber wherein a coil, which has a common axial core with that of the core wire, has a diameter larger than the target maximum diameter of the electrodeposited layer and whose pitches become sequentially rougher from the top end to the bottom end of said coil, is used as the anode, and the degree of tapering of the outer periphery of the electrodeposited layer is reduced when manufacturing the ferrule.

Another aspect of the invention is a method of manufacturing a ferrule for a multi-core optical fiber with the method wherein a plurality of core wires composed of metallic pipes—whose inside diameters are large enough so that optical fibers can be inserted thereinto—are used projections—which are positioned opposite each other—of a fixing member are fitted to both ends of the insertion holes of a plurality of the core wires, both ends of the insertion holes of a plurality of said core wires are nipped by the fixing member, a cathode is made by arranging and fixing the central axes of a plurality of the core wires parallel with each other at specified positions, and optical connectors are integrally coated and formed—as an electrodeposited layer—onto the outer periphery of the core wires by an electroforming method, namely by applying an electric current.

Another aspect of the invention is a method of manufacturing a ferrule for a multi-core optical fiber with the method wherein plural core wires are arranged and fixed in such a way that the central axes of the core wires' insertion holes are parallel with each other at specified positions, and such that the core wires are piled up so as to make plural layers, an electric current is first applied to the core wire that is at the center of all the core wires, so as to form an electrodeposited layer thereon, and the current is then applied to the adjacent core wires outwardly one by one so as to form additional electrodeposited layers thereon.

Another aspect of the invention is a method of manufacturing a ferrule for a multi-core optical fiber, wherein the initial bubbles of said core wire are removed so as to improve the wettability of the surface, so that air holes are prevented from forming in the electrodeposited layer when manufacturing the ferrule.

More particularly, a method according to the present invention includes a step for electrodepositing metal around a core wire made of a metallic pipe whose inside diameter is, for example, 0.05 mm–0.13 mm, by electroforming in accordance with the diameter of an optical fiber, so as to form cylindrical material whose outside diameter is 1 mm or less. Also, when a metal ferrule for an optical fiber is manufactured by electroforming, a conductive core wire is used, and a stainless alloy (for example, SUS 304) pipe is used as the material for the core wire. For such a core wire, there can easily be obtained a core wire that (a) is manufactured by a protrusion method using dies or a wiring method, and (b) has an accuracy of being about 125.0 µm±0.5 µm in diameter.

According to the present invention, because the thickness of the metal to be electrodeposited around the core wire can be restrained to a required minimum value by making the diameter of the outer shape of the cylindrical material to be 1 mm or less, it becomes extremely easy to grind the periphery of the cylindrical material so that eccentricity (i.e., deviation between (a) the center of the outer periphery of a metal ferrule for an optical fiber—when the outer periphery is regarded as a perfect circle—and (b) the center of an insertion hole) is restrained within a specified range, particularly within ±0.5 µm. Thus, the yield of metal ferrules for optical fibers as products also can be improved.

A method for using a metal ferrule for an optical fiber of the present invention will now be described. The ferrules for an optical fiber according to the present invention can be used extremely advantageously for various purposes where optical elements are to be used as parts for temporarily or permanently connecting optical fibers together. Because the outside diameter of the metal ferrules for optical fibers according to the present invention is significantly smaller than that of a conventional ferrule, it is possible, for example, to advantageously improve mounting density of the optical fiber for various kinds of connectors, such as a plug-type connector, a jack-type connector, an adapter, and a receptacle. Also, because such eccentricity is extremely small, the optical fibers can be connected more precisely and the loss of optical signals at the time of connecting can be significantly reduced.

BEST MODE FOR CARRYING OUT THE INVENTION

Embodiments of the present invention will now be described with reference to the drawings.

Figure 1:
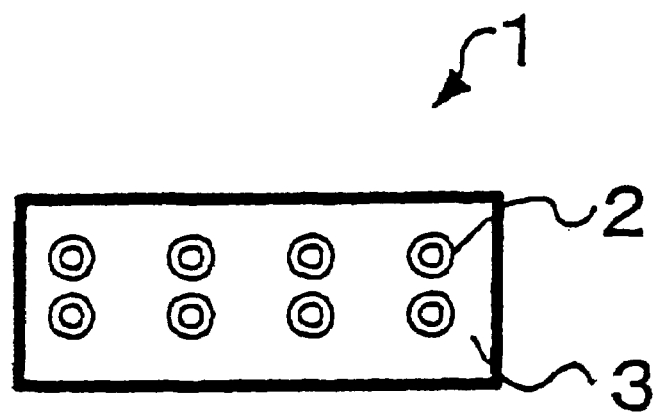
FIG. 1 is a front view of a connector of the present invention, which is manufactured by coating plural ferrules, which are arranged in multi-stages, with resin.
Figure 2:
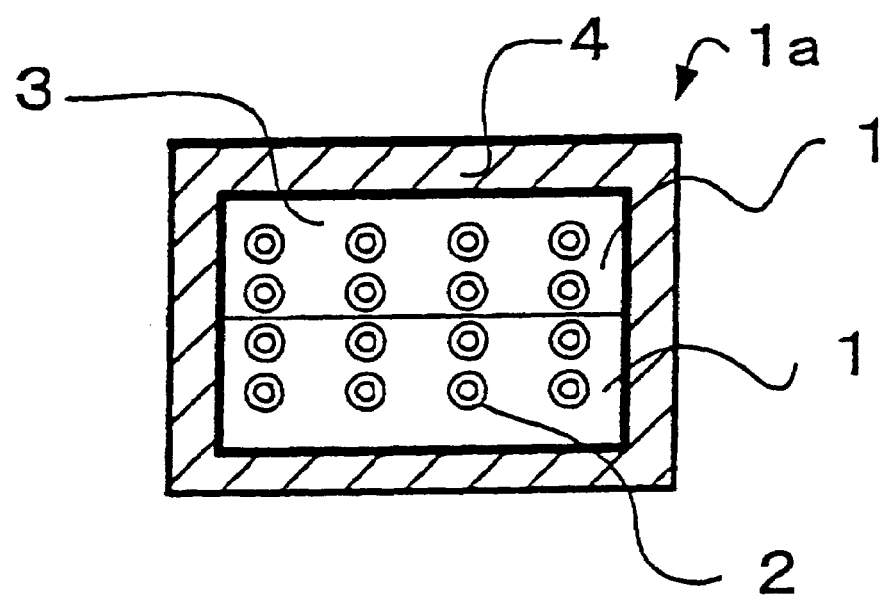
FIG. 2 is a front view of a connector of the present invention, which is manufactured by piling up the formed structures obtained in FIG. 1 and coating them with an external coating.

The words "a connector" in the present invention refer to the mold portion of a connector for connecting multiple-core optical fibers, excluding the housing portion of said connector. FIGS. 1 and 2 show one example of the present invention's connector. FIG. 1 is a front view of the connector, wherein plural cylindrical ferrules are arranged in one or more rows (two rows in FIG. 1), and are coated together by thermal-spraying or electroforming with a resin or a metal (including cement). FIG. 2 is a front view of the connector, wherein the formed structures obtained in FIG. 1 are formed into specified shapes and are piled up and coated by thermal-spraying with said resin or a metal.

FIG. 1 shows the connector, wherein plural ferrules (8 ferrules in this embodiment) are coated together in two stages by thermal-spraying or electroforming with a resin or a metal. In this figure, 1 is a connector, 2 are ferrules in which optical fibers can be inserted, and 3 is a coating that coats and fixes the ferrules 2 at specified positions by either thermal-spraying or electroforming with a resin or a metal. It is preferable that the outer surface of the ferrules 2 be roughened by blasting or scratching prior to the coating, so as to improve the adherence of the coating layer.

The connector 1 for a multi-core optical fiber of the present invention has n ferrules in one line (n designates an integral number of 2 or more; in FIGS. 1, n=4) and K stages (K designates an integral number of 1 or more). Both ends of the ferrules 2 are fixed with a positioning member, described below, in such a way that the axial directions of the insertion holes of the ferrules 2 are the same and so that all the ferrules 2 can be arranged at a specified pitch. A blast effect is specified on the ferrules 2 by spraying epoxy-base resins blended with solvents and curing agents, and so on, while the ferrules 2 are fixed in the above-mentioned position, and the ferrules 2 are coated by flame-spraying, electric-arc spraying, and electroforming with resins or metals, followed by a grinding of the surface of the coating 3 so as to obtain specified dimensions.

Each said ferrule 2 is manufactured into a cylindrical shape made of a ceramic having good process ability (such as alumina, zirconia, or crystal glass), a metal such as nickel or a nickel alloy, and plastic, and so on, and the center hole thereof is processed with high accuracy so that the center hole has circularity, concentricity, and cylindricity that are identical to those of the outside diameters of the optical fiber to be inserted in the center hole. Also, the outside diameter, hole diameter, and hole eccentricity, and so on are precisely processed at a tolerance on the order of a sub-micron. The outside diameter of a standard ferrule is usually 2.5 mm or 1.25 mm, but in the present invention it is only necessary that a ferrule can be held at its two ends, and therefore, the present invention can be applied with nonstandard ferrules or with ferrules whose outer shapes are deformed.

As resins for forming the coating 3 in the present invention, it is desirable to select raw materials that are fluidized at a comparatively low temperature, that have good heat resistance and corrosion resistance, and that are composed of thermoplastic resins having a small coefficient of thermal expansion. FORTRON®, whose coefficient of linear expansion is $1~2\times10^{-5}/°$ C., supplied by Polyplastics Co., Ltd., and IDEMITSU PPS, which is a polyphenylenesulfide-base resin supplied by Idemitsu Petrochemical Co., Ltd., can be used as preferable examples of thermoplastic resins. Besides these two resins, however, any thermoplastic resin that satisfies the above-mentioned physical properties can also be used to implement the present invention. Also, thermal spray can be performed using a thermal spraying material composed of epoxy resins and curing agents. In addition, at the time of the thermal-spraying, a surface-roughening agent composed of epoxy resins (thermosetting resins), solvents, and curing agents,—Sabnor (trade name) supplied from Arc Techno Co., Ltd.—can be sprayed on the surface layer of the ferrules so as to form a rough surface.

In a thermal-spraying method of the present invention using a metal, there can be adopted electric-arc spraying and gas-flame spraying that—due to the high temperature caused by spraying, or due to the speed of spraying—exerts little thermal or spraying-speed influence on the ferrules to be coated. In the thermal-spraying method of the present invention using a metal or resin material, there can be adopted gas-flame spraying and so on. In electric-arc spraying, an arc is generated between the two tips of thermal-spraying materials that are continuously supplied through two nozzles of a thermal-spray gun, and the melting part of the thermal-spraying materials (melted by the arc) is sprayed as fine particles onto the surface of the substrate by an air jet that blows out of another nozzle that is between the above-mentioned two nozzles, so as to form a coating on the substrate. The alignment of the thermal-spraying material used is 0.8 mm–5.0 mm. However, it is difficult to measure the temperature of the arc. The temperature of arc varies, depending on the arc atmosphere, the materials that constitute the electrode, the electric current, and so forth. As one example, the arc temperature at a current of 280 A between iron electrodes is spectrographically measured at 6,100 K±200 K. In the electric-arc spraying method, droplets are generated under such a temperature. The fused metal is injected as thermal-sprayed particles by a compressed-air jet, and it flies in the air towards the substrate face while the temperature of the metal decreases. In the present invention, a Low-Temperature Metal-Spraying System using Arcboy PC120 (or 250) iDEX (Arc Techno Co., Ltd.) that metals can be sprayed on the surface of approximately 40° C. is preferably adopted, because it has little thermal influences on the ferrules.

Two advantages of electric-arc spraying are (1) that the degree of adhesion of the coating to the substrate and the strength of the coating itself are greater than those in flame-spraying, and (2) that the operating cost can be low. Also, wires of two different kinds can be used as thermal-spraying materials, and they can be alloyed together to form a coating in the process of thermal-spraying. The disadvantages are (1) that the thermal-spraying material is limited to a conductive material, and (2) that, when the speed of supplying the thermal-spraying material is too low for the output of the material, the thermal-spraying material is overheated and oxidized, causing the composition of the elements in the alloy is locally changed.

The flame-spraying method of the present invention is a thermal-spraying method that has a heat source that is a flame of oxygen and fuel. The flame-spraying method of the present invention can be divided into three types: wire-flame spraying, rod-flame spraying, and powder-flame spraying.

The process of performing thermal-spraying according to the flame-spraying method using resins or metals as described in the present invention is as follows: (a) the powdery material to be sprayed is blown out into the airflow from the central nozzle of the thermal spray gun, (b) the air jet is injected concentrically on the periphery of the flow, and (c) propane and oxygen, or propane and air, are combusted on the outer circumference of the airflow. When thermal-spraying is performed, the flame and the air jet are adjusted so that the sprayed material powder can be fused—or cured—appropriately when the material powder collides with the surface of the substrate. Further, it is preferable that the thermoplastic resin (polyphenylenesulfide-base resin) in the present invention be used within a fusion-temperature-range of 300° C.–330° C. so as to obtain an ideal coating. With a thermal-spraying method according to the present invention, thermal influences on the ferrules (such as deformation and bending) can be avoided, and an even thermal-sprayed layer can be obtained.

FIG. 2 shows a connector 1a for a multi-core optical fiber, with said connector manufactured by cutting the formed structures (the connectors for the multi-core optical fibers) into a specified shape, piling them up, and then coating all of them together by the external coating 4, which is also composed of resins or metals formed by flame-spraying or electric-arc spraying.

Figure 3:
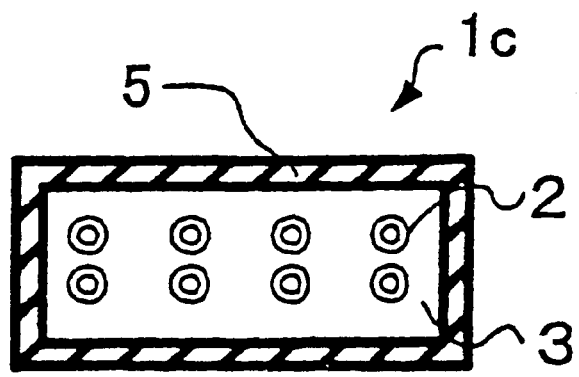
FIG. 3 is an explanatory view of a connector 1c for a multi-core optical fiber of the present invention.
Figure 4:
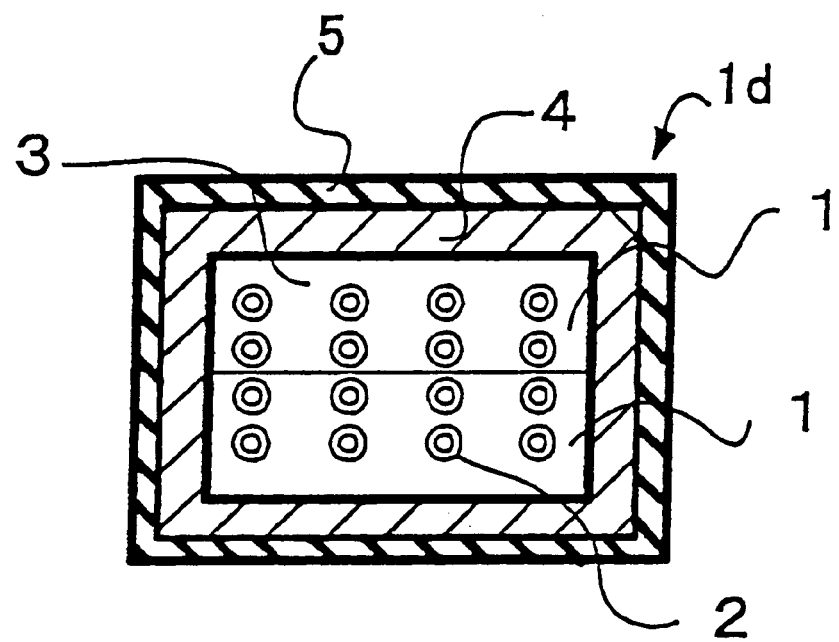
FIG. 4 is an explanatory view of a connector 1d for a multi-core optical fiber of the present invention.

As shown in FIGS. 3 and 4, a connector of the present invention includes:
 (a) a connector 1c for a multi-core optical fiber, wherein the metallic layer 5 is formed on the surface of a coating except for the coating's end face having the ferrule holes, and
 (b) a connector 1d for a multi-core optical fiber, wherein two layers of structures are piled up and the metallic layer 5 is formed on the surface coated with the external coating 4.

Said metal layer 5 is formed by electric-arc spraying or flame-spraying a specified metal on the surface (except for the sides having ferrule holes) of the connector, and is effective for reinforcing the connectors 1 and 1a. In addition, if displacement of the ferrules is eventually found, the surface of this metal layer 5 can be ground so as to make a final adjustment of the position of the ferrules.

A method of manufacturing a connector of the present invention will now be described.

When manufacturing a connector according to the present invention, the ferrules into which the optical fibers are to be inserted are first positioned in a specified arrangement.

Figure 5:
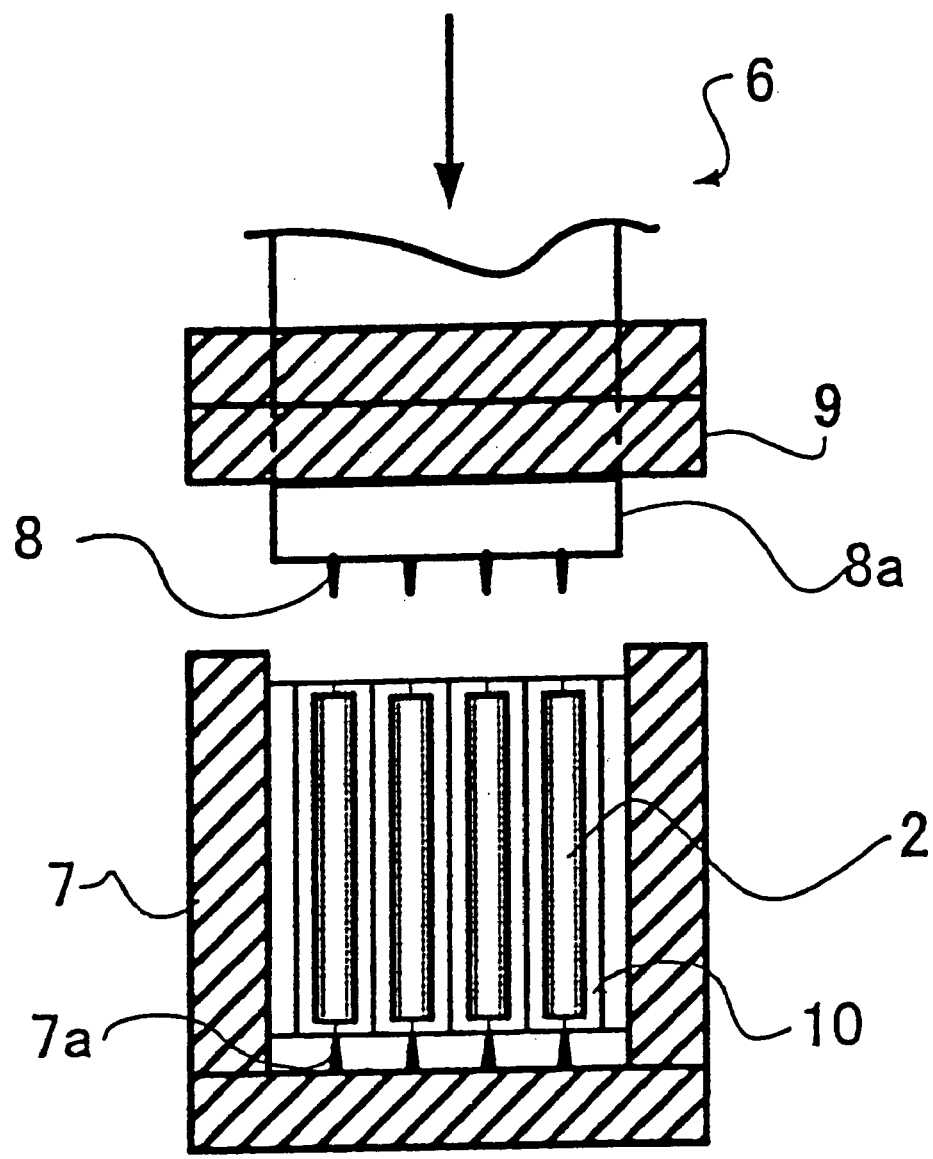
FIG. 5 is a schematic top view of a positioning member in one embodiment of the present invention.

FIG. 5 is a schematic top view of a positioning member for fixing the ferrules at specified positions in an embodiment of the present invention.

In FIG. 5, a positioning member 6 for fixing the ferrules 2 at specified positions is composed of an alloy of metals such as iron, nickel, and chromium. Said positioning member 6 is constituted with a mobile positioning member 9 that has plural projections 8, and a stationary positioning member 7, and the positioning members are inserted into the respective ferrules so that each of the ferrules can be positioned. It is preferable that each of said projections 8 be formed into a cone-shape, a pyramid-shape, a needle-shape, a semi-spherical shape, or a combination thereof, but any other shapes can also be applied as long as the position of each ferrule's insertion hole can be set precisely.

Said mobile positioning member 9 accommodates plates 8a having the projections 8, and is structured in such a way that a plurality of the plates 8a slide independently. When the ferrules 2 are set, the plates 8a slide down toward the stationary positioning member 7. At the front of each plate 8a, projections 8 are disposed at specified positions opposite to the projections 7a of the stationary positioning member 7. Said projections 7 and 8 are formed at an accuracy on the order of a micron, and the central axes of the insertion holes of the ferrules are placed in the same direction when each of the projections 7 and 8 is inserted into the ferrules 2.

A lift 10 that can go up or down, and that has V-shaped grooves for supporting the plural ferrules 2, is installed at the lower space of said positioning member 6, so that the ferrules 2 on the V-shaped grooves can be moved up sequentially to the height of the plate that performs the next operation.

In the above embodiment, the ferrules 2, whose number can vary, as desired, are supplied as a set from a ferrule feeder (not shown) and are put on the V-shaped grooves of the lift 10. When the ferrules 2 are put on the lift 10, the lift 10 ascends toward the highest plate of the mobile positioning member 9, and the mobile positioning member 9 moves down so that the plate 8a is engaged between both ends of U-shaped walls of the stationary positioning member 7. The member 9 moves further down, and the projections 7 and 8 are respectively inserted into the ferrules' insertion holes so that both ends of the ferrules are properly positioned. Similar operations are performed with the other ferrules, and the setting of the ferrules is completed. Under this condition, the periphery of the positioning member 6 is fixed by a fixing member (not shown) so as to prevent the displacement of the ferrules, and then coating with resin and so on is performed thereon.

Figure 6:
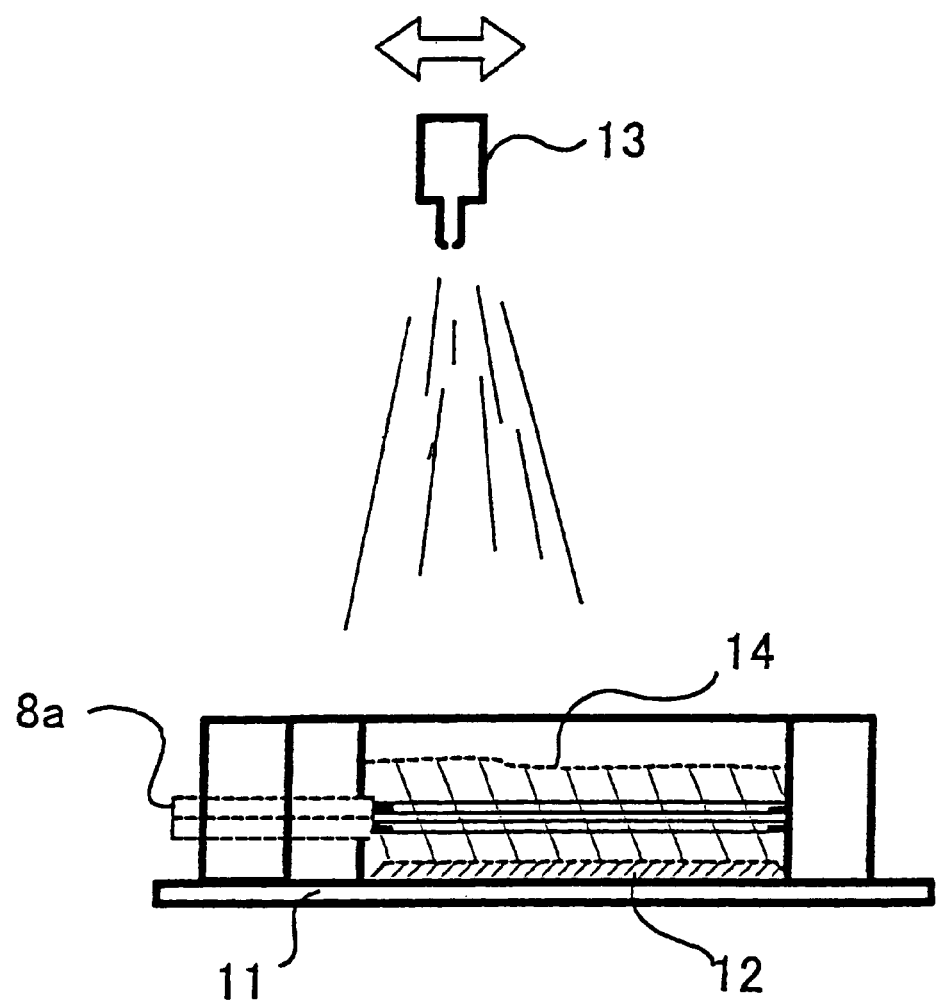
FIG. 6 is a schematic view illustrating a condition in one embodiment of the present invention, where the ferrules, which are fixed onto a positioning member 6, are coated with resin.

FIG. 6 is a schematic diagram illustrating the condition where resin is applied onto the ferrules 2, which are fixed on said positioning member 6.

FIG. 6 shows a tray 11, on which said positioning member 6 is placed, a parting agent 12, a nozzle 13 for injecting the coating resin, and a coating-resin layer 14.

After the setting of said plural ferrules 2 is completed, the positioning member 6 is conveyed onto the tray 11. At this time, it is better to set the parting agent 12 under the thermal-spraying area so as to prevent the coating resin 14, which is to be sprayed, from closely adhering to the tray 11. Then, the polyphenylenesulfide-base resin is injected from the nozzle 13 by a flame-spraying method in such a manner that the temperature near the ferrules 2 is kept within the range of 150° C.–200° C. for the coating to be covered all the area associated.

Coating can be performed by flame-spraying using a thermal spraying material made of epoxy resins and curing agents.

At the time of thermal spraying, Sabnor (made by Arc Techno Co., Ltd.) composed of epoxy resins, solvents, and curing agents, can be sprayed onto the ferrules so as to roughen their surfaces, after which the ferrules are coated with said polyphenylenesulfide-base resin.

After the aforementioned coating is completed and the temperature is lowered, the outside of the coated layer is ground so as to precisely position the ferrules in the structure. Thereby, a connector 1, shown in FIG. 1, is obtained.

Said connectors 1 are piled up, and the ferrules' holes between the piled connectors 1 are positioned and fixed. Under the same condition as that described above, said resin or a metal is applied by flame-spraying or electric-arc spraying onto the surface (except for the sides that have the ferrule holes) of the piled connectors 1 so that an external coated layer 4 is formed thereon, thereby obtaining the connector 1a shown in FIG. 2.

Connectors for multi-core optical fibers (multi-core ferrules) can also be manufactured by electroforming a plurality of cylindrical metal ferrules. A method for manufacturing a connector with an electroforming method will now be described with reference to the drawings.

Figure 7:
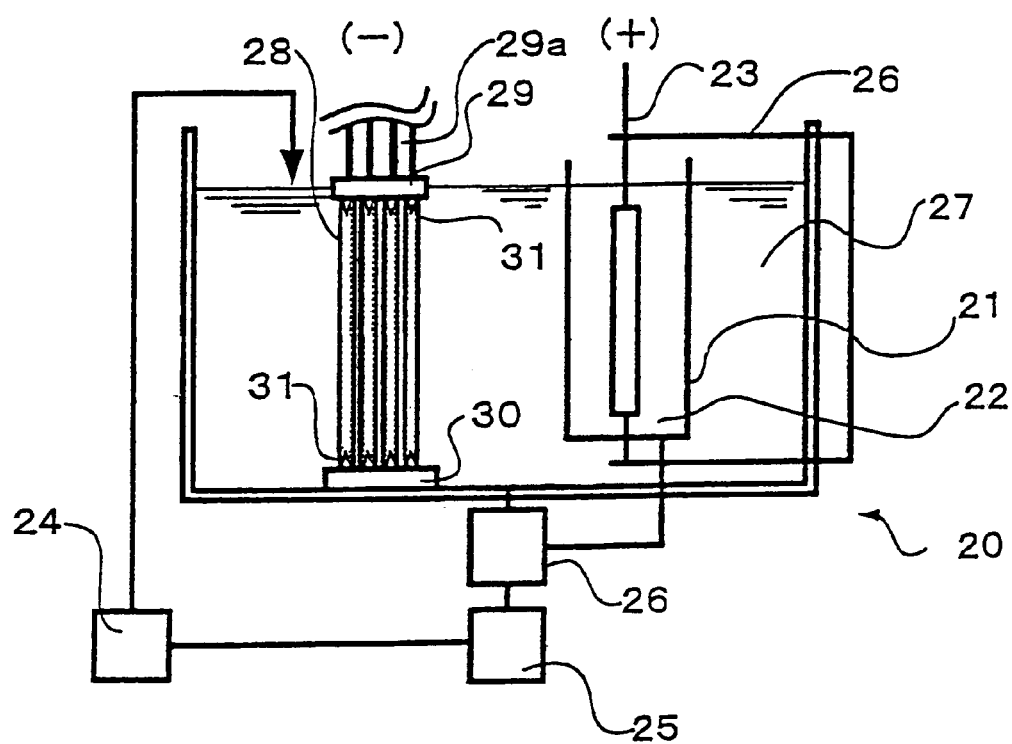
FIG. 7 is a schematic view of a device for manufacturing a metal multi-ferrule for an optical fiber by an electroforming method in one embodiment of the present invention.

FIG. 7 is a schematic diagram of a device for manufacturing by the electroforming method a multi-core ferrule for a multi-core optical fiber. In FIG. 7, the electroforming bath 20 is separated into an anode (+) and a cathode (−) by a diaphragm 21. The material of the anode 23 is appropriately selected depending on the metal to be electrodeposited on the periphery of a core-wire rod (a cylindrical ferrule). Nickel, iron, copper, or cobalt is normally used as the material for the anode 23. The electroforming liquid 27, which is usually water-based and contains some metal ions corresponding to the one expected to be electrodeposited on the periphery of a core wire 28, is circulated via the valve 26 and the filter 24, usually of pore size 0.1 μm–2 μm, by the pump 25 as indicated in FIG. 7.

Nickel, iron, copper, cobalt, tungsten, and alloys thereof are examples of metals to be electrodeposited by electroforming. Therefore, what can be used as an electroforming aqueous solution 27, which contains metal components such as the above-mentioned, are:

(a) aqueous solutions of nickel sulfamate, nickel chloride, nickel sulfate, ferrous oxide sulfamine, ferrous oxide borofluoride, copper pyrophosphate, copper borofluoride, copper silicafluoride, copper titanfluoride, copper alkanolsulfonate, cobalt sulfate, and sodium tungstate; or (b) a flotation liquid obtained by dispersing in water fine powder of silicon carbide, tungsten carbide, boron carbide, zirconium oxide, silicon nitride, alumina, or diamond.

Of the above, an aqueous solution including sulfamine is extremely efficient as an electroforming aqueous solution 27, because it is chemically stable and electroforming or dissolving can be easily performed with it.

The plural core wires (cylindrical ferrules) 28, which are precisely positioned opposite each other inserted by the projections 31 that are on the upper fixing member 29 and the lower fixing member 30, respectively, work as the cathode. Both the upper fixing member 29 and the lower fixing member 30 are made of insulating materials. Each projection 31 on the upper fixing member 29 is independently connected to a conductive wire 29a on the negative side, so that the current can be selectively applied to each of the plural core wires 28.

The thickness of the metal that is electrodeposited on the periphery of the core wire by electroforming is not always constant at all portions of the core wire, depending on the structure of the electroforming cistern, the anode, or the cathode. Therefore, when manufacturing a metal multi-ferrule for a multi-core optical fiber, the current should be applied first to one core wire that is positioned in the center of plural core wires, so as to form an electrocoating on the core wire in the center, and then the current is applied sequentially to the adjacent core wires to form an electrocoating thereon, so that dense electrocoating can be integrally formed with few pores therein.

Figure 8:
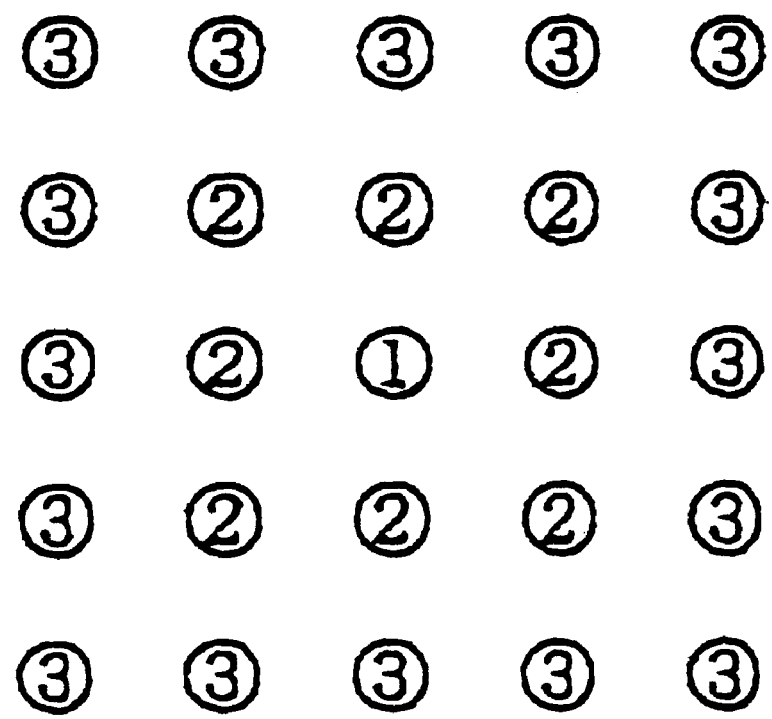
FIG. 8 illustrates the order of applying the current to core wires when a metal multi-ferrule for a multi-core optical fiber is manufactured.

FIG. 8 is an explanatory view showing the order in which the current should be applied to the core wires. The current is applied in the order from (1) to (3) as illustrated in FIG. 8, which shows an example of a 25-core ferrule, wherein in order to perform electrodeposition the current is applied as follows: (1) to the core wire numbered 1, which is at the center of the specified arrangement; (2) to the core wires numbered 2, which are positioned around the core wire numbered 1; and (3) to the core wires numbered 3, which are positioned farthest from the core wire numbered 1 and around the core wires numbered 2. Thus, the plural core wires (in this case, 25 wires) are coated with an electrodeposited layer that is dense and has no clearance. In performing electroforming on the core wires in the central part, the thickness of a specific part of the electrodeposited layer on the core wires can be further adjusted by immersing the electrodeposited layer in an appropriate amount of electroforming aqueous solution after placing a shielding material on the part of the electrodeposited layer whose thickness does not need adjustment, so that only the other part (whose thickness needs adjustment) of the electrodeposited layer will be exposed to the electroforming aqueous solution.

In electroforming under the condition where the electroforming bath 20 is filled with the electroforming aqueous solution 27 described above, the core wires 28 are dipped in the cathode side, and the current is applied to the anode 23 and the core wires 28 so that the current density will be about 4 $A/dm^2$–20 $A/dm^2$. At this time, when the pH value of the electroforming aqueous solution 27 is maintained on the acid side, at pH 3–pH 6, and more preferably at pH 4–pH 5, metal of a specified thickness can be electrodeposited on the periphery of the plural core wires 28 in about 12 hours after the start of applying the current. Organic impurities can be regularly removed from the electroforming aqueous solution 27 by using activated carbon. Or, prior to electroforming, inorganic impurities, such as steel, can be removed from the electroforming aqueous solution 27 by applying current to both the cathode and the anode at a low current density of about 0.2 $A/dm^2$, where a nickel-plated, corrugated iron plate and carbon are used as the cathode and the anode, respectively.

The structure composed of plural cylindrical ferrules and the electrodeposited layer can be applied to the multi-core ferrule for optical fibers, after grinding the outer surface of the layer so that the ferrules are precisely positioned therein.

A method of manufacturing a metal ferrule for a multi-core optical fiber according to the present invention will now be described with reference to the drawings.

Figure 9:
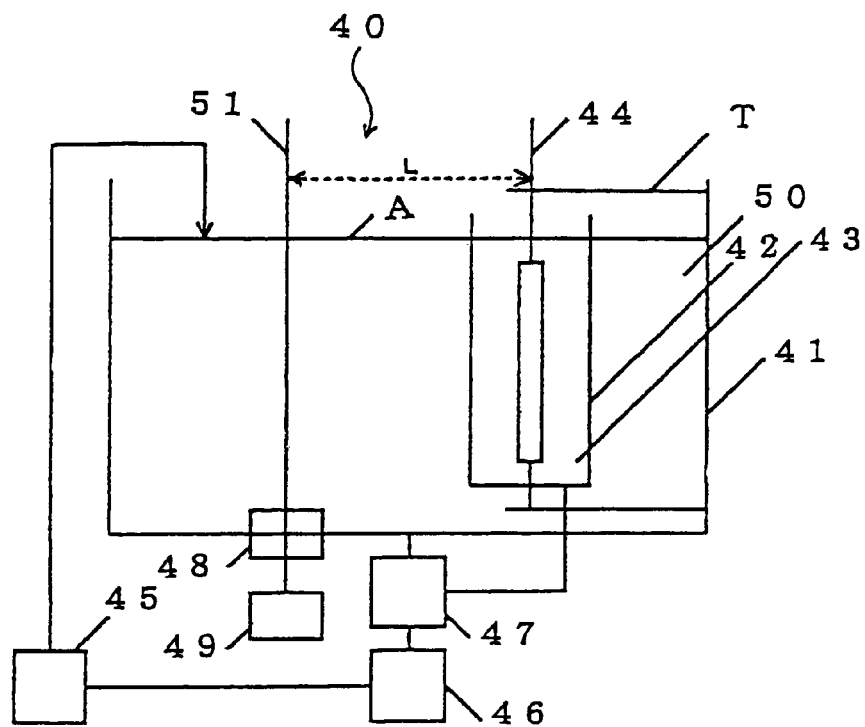
FIG. 9 is a schematic vertical-sectional view of a device for manufacturing a metal ferrule for an optical fiber in one embodiment of the present invention.

FIG. 9 shows a device 40 for manufacturing a cylindrical material by an electroforming method. In FIG. 9, 41 is an electroforming bath whose inside is separated into an anode chamber 43 and a cathode side by a partition membrane 42. In the anode chamber 43, an anode 44 is set opposite the inside of the partition membrane 42, along the inner wall of the electroforming bath 41. The material for the anode 44 is appropriately selected according to the metal to be electrodeposited around a core wire; usually, nickel, iron, copper or cobalt is used for the material.

A filter 45, usually having a pore size of 0.1 µm–2 µm, circulates and filters the electroforming liquid 50—which is usually water-based and contains some metal ions corresponding to the kind of metal to be electrodeposited on the periphery of a core wire—via a pump 46 at high speed. In FIG. 9, there also are a valve 47, an O-ring 48, and a motor 49. Nickel, iron, copper, cobalt, tungsten, and alloys thereof are examples of metals to be electrodeposited by electroforming. Therefore, what can be used as an electroforming aqueous solution 50, which contains metal components as the above-mentioned, are:

(a) aqueous solutions of nickel sulfamate, nickel chloride, nickel sulfate, ferrous oxide sulfamine, ferrous oxide borofluoride, copper pyrophosphate, copper borofluoride, copper silicafluoride, copper titanfluoride, copper alkanolsulfonate, cobalt sulfate, and sodium tungstate; or (b) a flotation liquid obtained by dispersing in water fine powder of silicon carbide, tungsten carbide, boron carbide, zirconium oxide, silicon nitride, alumina, or diamond.

Of the above, an aqueous solution including sulfamine is extremely useful as an electroforming aqueous solution 50, because it is chemically stable and electroforming or dissolving can be easily performed with it.

Metal components of the electroforming aqueous solution 50 eventually become a metal material that constitutes a metal ferrule for an optical fiber of the present invention. Therefore, when a metal ferrule for an optical fiber used for PC connection is desired, it is desirable to use, for example, nickel or a nickel alloy such as a nickel/cobalt alloy, which is easy to grind.

As described above, the manufacturing method of the present invention includes a step for electrodepositing metal around the periphery of a core wire to form a cylinder material having an outside diameter of about 1 mm or less, and a step for processing the outside diameter of the cylindrical material into a perfect circle having a diameter of 1 mm or less.

The thickness of the metal that is electrodeposited on the periphery of the core wire by electroforming is not always the same at all positions of the core wire, depending on the structure of the electroforming bath and the anode. Therefore, the larger the outside diameter of the cylinder material, the bigger the degree of eccentricity of the insertion hole.

However, according to the present invention, because the outside diameter of the cylinder material is made to be about 1 mm or less in order to keep the thickness of the metal electrodeposited around the core wire to a required minimum value, it is significantly easy to restrain eccentricity (i.e., deviation between (a) the center of a circle—when the outer periphery of a metal ferrule for an optical fiber is regarded as a perfect circle—and (b) the center of an insertion hole) in a specified range, within ±0.5 µm to be more specific, and the yield of metal ferrules for optical fibers as products can be improved.

Because the core wire is a factor that determines the inside diameter of a metal ferrule for an optical fiber, namely the size of the diameter of the insertion hole into which the optical fiber wire is inserted, high precision is required regarding to maintain evenness of the thickness, circularity (proximity between a desired diameter and the actual diameter of the core wire), and linearity.

Such a core wire can be obtained, for example by (1) a method for protruding the above-mentioned metals with dies, or (2) a wiring method, or (3) a centerless processing method. In the case of a stainless alloy, a core wire having accuracy of about 125.0 μm±0.5 μm in diameter can be easily obtained.

Also, when a shape other than a circle is desired as the shape of the insertion hole, the above-mentioned metal materials are protrusion-molded with dies.

In electroforming under the condition where the electroforming bath 41 is filled with the electroforming aqueous solution 50 described above, the core wires 51 are dipped in the cathode side, and positive and negative currents are applied to the anode 44 and the core wires 51, respectively, while the core wire 51 is rotated around the axial core in the longitudinal direction of the core wire as necessary, so that the current density will be about 4 $A/dm^2$–20 $A/dm^2$. At this time, when the pH value of the electroforming aqueous solution 50 is maintained on an acid side, at pH 3–pH 6, and more preferably at pH 4–pH 5, metal of a specified thickness can be electrodeposited on the periphery of the plural core wires 51 within about 12 hours, normally 3 to 8 hours after the start of applying the current. Organic impurities can be regularly removed from the electroforming aqueous solution 50 by using activated carbon. Or, prior to electroforming, inorganic impurities, such as steel, can be removed from the electroforming aqueous solution 50 by applying current to both the cathode and the anode at a low current density of about 0.2 $A/dm^2$, where a nickel-plated, corrugated iron plate and carbon are used as the cathode and the anode, respectively.

The electrodeposited layer 52 can be used as a metal ferrule for an optical fiber directly after it is cut into a specified length according to the purpose, but normally the outer periphery of the layer is ground into a perfect circle at the precision level of a sub-micron (within ±0.5 μm) by NC machining and the like. According to the present invention, because the thickness of the metal to be electrodeposited around the core wire is made to be equal to the outside diameter of the cylindrical material, which is about 1 mm or less, eccentricity of a metal ferrule for an optical fiber as a product can be easily kept within ±0.5 μm.

Figure 10:
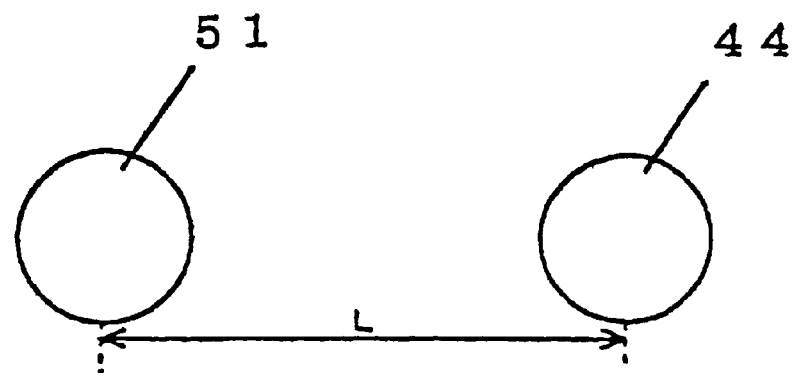
FIG. 10 illustrates a method for forming an electrodeposited layer in an embodiment of the present invention.

In order to restrain the concentricity and circularity of the outside and inside diameters of the electrodeposited layer 52 within the desired degree of precision, the distance between the cathode and anode is changed, or the rotation-angle speed of the core wire 51 is changed by utilizing a traverse T on the side of an anode 44 along with the rotation of the core wire 51, which is a cathode, so that the current value is changed, as shown in FIG. 10. Thus, the concentricity and circularity of the inside and outside diameters of the electrodeposited layer will be restrained within the desired degree of precision.

Figure 11:
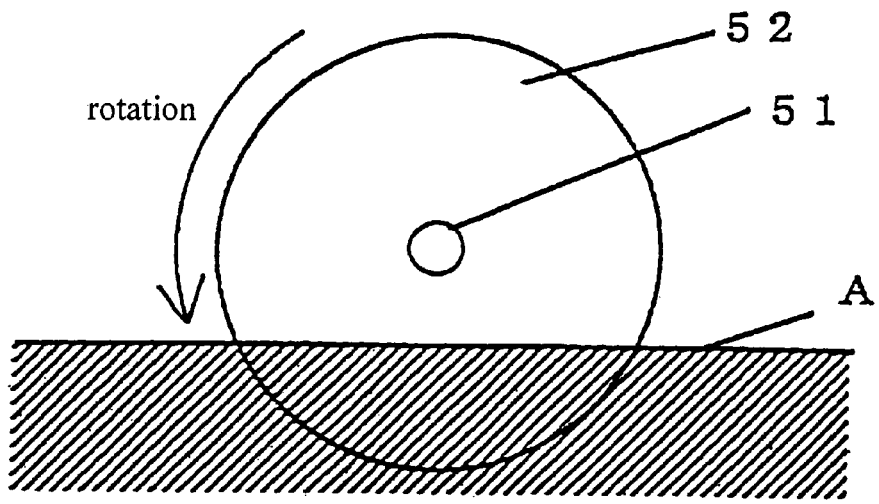
FIG. 11 is a side view showing a method for rotating a cathode side by making both poles horizontal in order to correct the concentricity and circularity of the inside diameter and outside diameter of an electrodeposited layer in an embodiment of the present invention.
Figure 12:
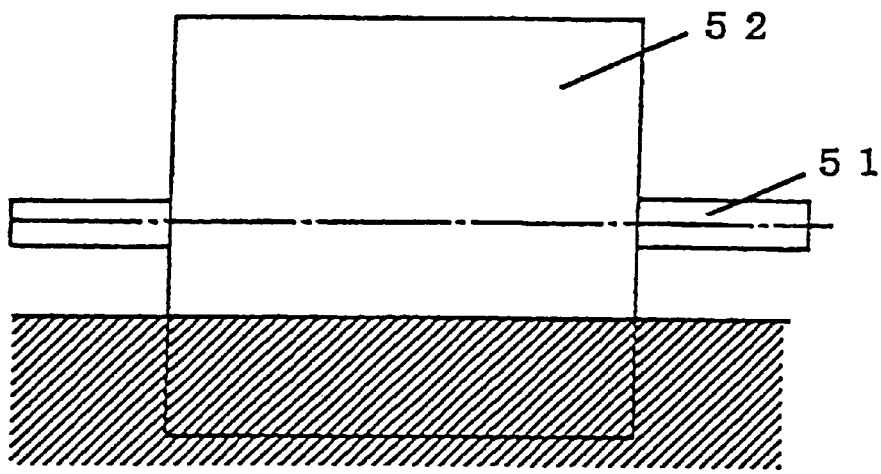
FIG. 12 is a front view showing a method for rotating a cathode side by making both poles horizontal in order to correct the concentricity and circularity of the inside diameter and outside diameter of an electrodeposited layer in an embodiment of the present invention.
Figure 13:
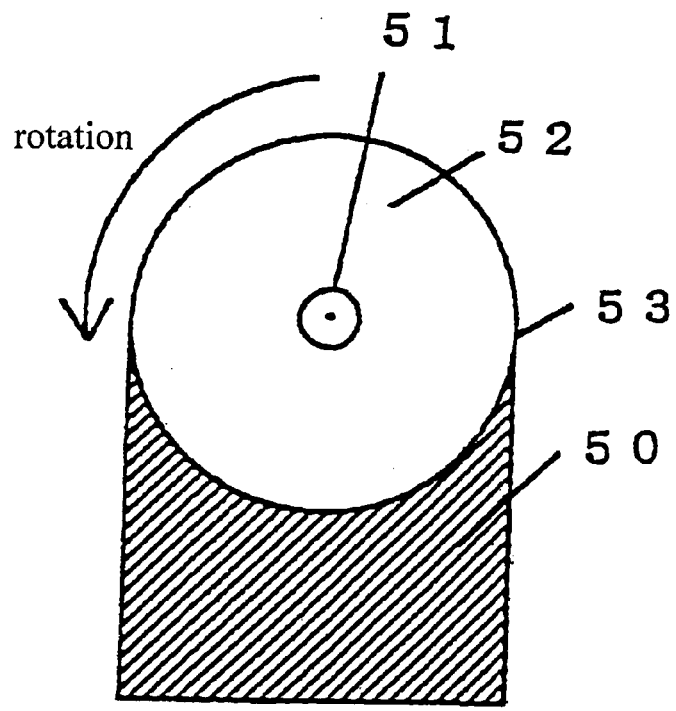
FIG. 13 is a side view showing a method for (a) placing a shielding membrane on a cathode side and (b) rotating the cathode side by making both poles horizontal, in order to correct the concentricity and circularity of the inside diameter and outside diameter of an electrodeposited layer in an embodiment of the present invention.
Figure 14:
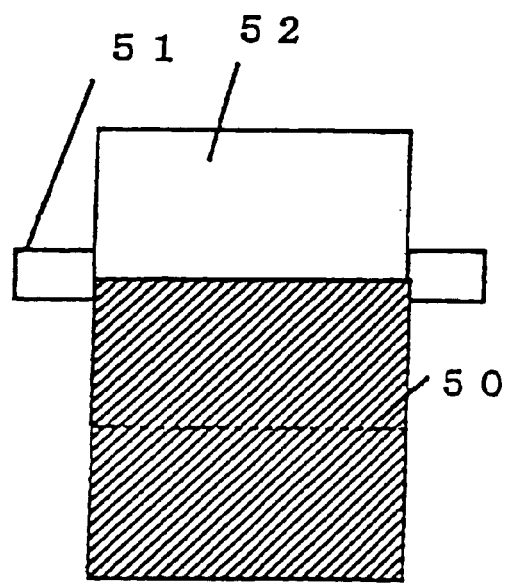
FIG. 14 is a front view showing a method for (a) coating a shielding membrane on a cathode side and (b) rotating the cathode side by making both poles horizontal, in order to correct the concentricity and circularity of the inside diameter and outside diameter of an electrodeposited layer in an embodiment of the present invention.

At the time of forming the electrodeposited layer 52, as shown in FIGS. 11 and 12, only a portion of the electrodeposited layer to be reformed is dipped in the electroforming aqueous solution while adjusting excessiveness and shortage, and as shown in FIGS. 13 and 14, a shielding membrane 53 is placed on the electrodeposited layer 52 and only a portion of the electrodeposited layer to be corrected is dipped in the electroforming aqueous solution 50, so that the thickness of the metal electrodeposited layer is even throughout.

Figure 15:
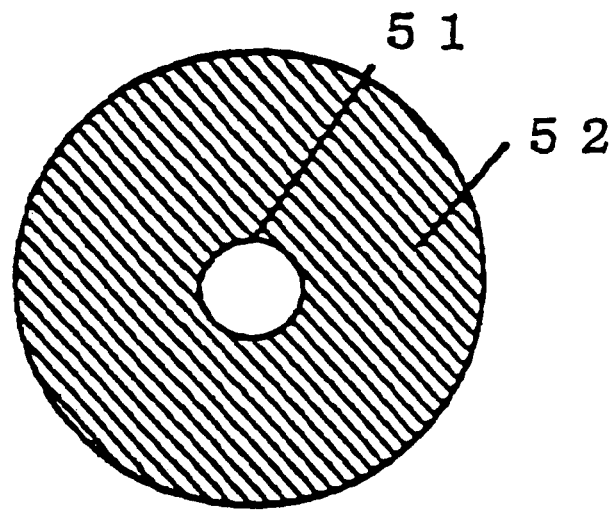
FIG. 15 is a side view showing a method for shielding both sides of an anode with an insulating material in order to correct the concentricity and circularity of the inside diameter and outside diameter of an electrodeposited layer in an embodiment of the present invention.
Figure 16:
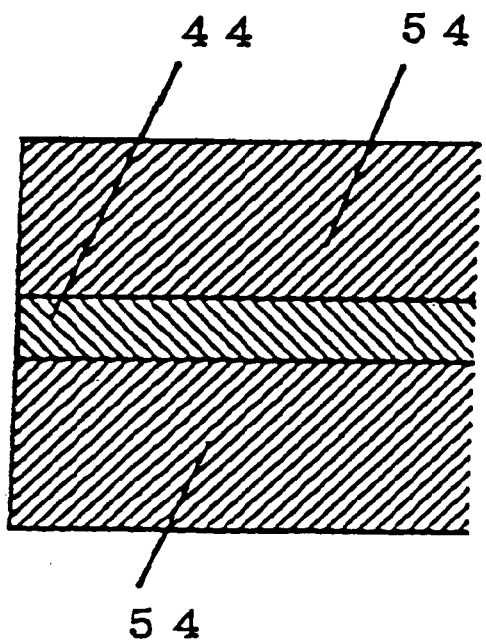
FIG. 16 is a front view showing a method for shielding both sides of an anode with an insulating material in order to correct the concentricity and circularity of the inside diameter and outside diameter of an electrodeposited layer in an embodiment of the present invention.

As shown in FIG. 15, the width of the anode is made smaller than the diameter of the electrodeposited layer, and, as shown in FIG. 16, insulating materials 54 are set on both sides in the width direction of the anode 44, so that the thickness of the metal electrodeposited layer is even throughout.

Figure 17:
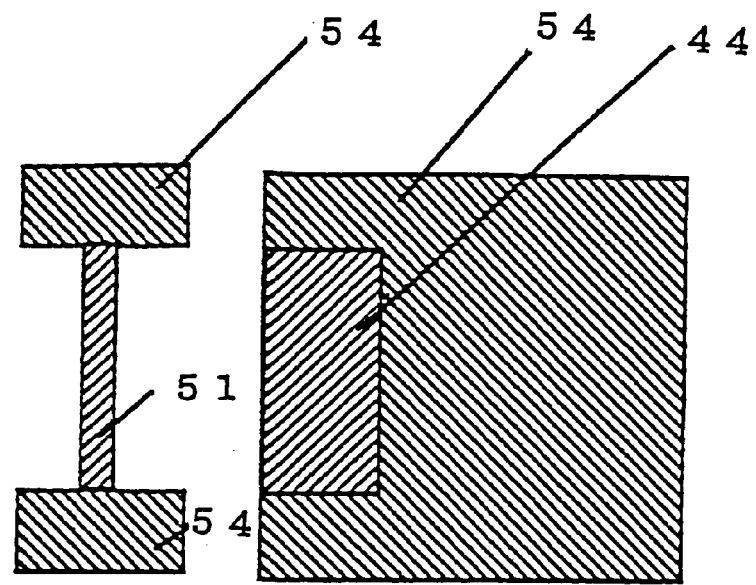
FIG. 17 illustrates a method for shielding the upper and lower parts of both poles with an insulating material, making them parallelly opposed to each other, and alternately applying electric current through both poles, in order to correct the tapered shape of an electrodeposited layer and to equalize the lengths of both the anode and cathode in an embodiment of the present invention.

In the embodiment shown in FIG. 17, in order to form a cylindrical shape without causing tapering of the electrodeposited layer, the length of the core wire 51 to be electrodeposited is made equal to the length of the anode 44, the height of the end point of the core wire and the height of the end point of the anode are made equal, and both poles are set parallel to each other. While both poles are, for example, surrounded by the insulating material 54 so as to prevent electrodepositing, the electrodeposited layer is formed while alternately changing the direction of the current applied to both the cathode and anode, so that the thickness of the metal electrodeposited layer is even throughout the cathode side.

Figure 18:
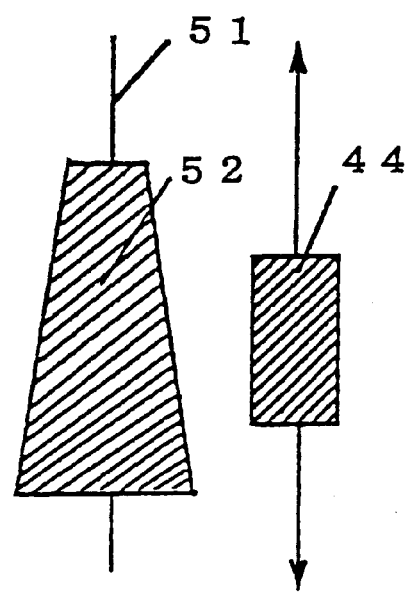
FIG. 18 illustrates a method for vibrating an anode vertically corresponding to the aforementioned tapering, in order to correct the tapered shape of an electrodeposited layer in an embodiment of the present invention.

An embodiment shown in FIG. 18 shows a means for reforming the tapering of the electrodeposited layer, where either or both of the anode 44 and the cathode (core wire) 51 are moved up and down while keeping them parallel to each other. Depending on the degree of the tapering, a thick metal electrodeposited portion of the electrodeposited layer 52 is oscillated at high speed and a thin portion thereof is oscillated at low speed, while both the cathode and the anode are in synchronization with each other, so that the thickness of the metal electrodeposited layer is even throughout the cathode side.

Figure 19:
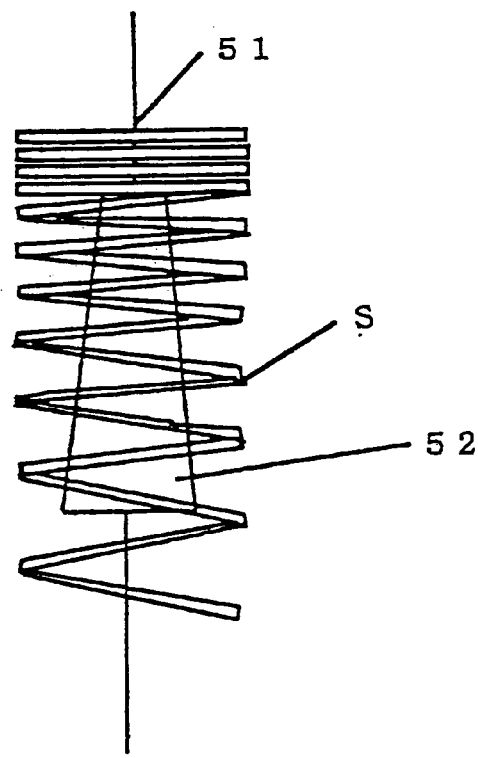
FIG. 19 illustrates a method for making an anode into a coil and utilizing the thickness of a metal electrodeposited layer to cope with the rough density of the coil in order to correct the tapered shape of the electrodeposited layer in an embodiment of the present invention.

In the embodiment shown in FIG. 19, there is provided a means for correcting the tapering of the electrodeposited layer. In this embodiment, which is meant to deal with a case where an electrodeposited layer of the cathode has a tapered shape, (1) the anode is wound into a coil (a coiled anode S), (2) the coil is wound densely at a thin metal electrodepositing portion of the electrodeposited layer 52, (3) the coil is wound roughly at a thick portion of said layer, and (4) electric current is applied through both poles, so that the tapering of the electrodeposited layer is corrected.

In order to remove initial bubbles on the core wire and to improve the wettability of said wire, the following can be done while managing the temperature of the liquid:
 (1) dipping the core wire into, and taking it out of, aqueous solution several times;
 (2) generating large bubbles and allowing them to go out of the bottom portion of the core wire;
 (3) oscillating the core wire in the aqueous solution; and
 (4) rotating the core wire at high speed.

For convenience in mounting a connector, as well as to improve the mechanical strength, the outside diameter of the metal ferrule 55 for an optical fiber should preferably be 1 mm or less, and preferably 0.50 mm–0.75 mm.

Figure 20:
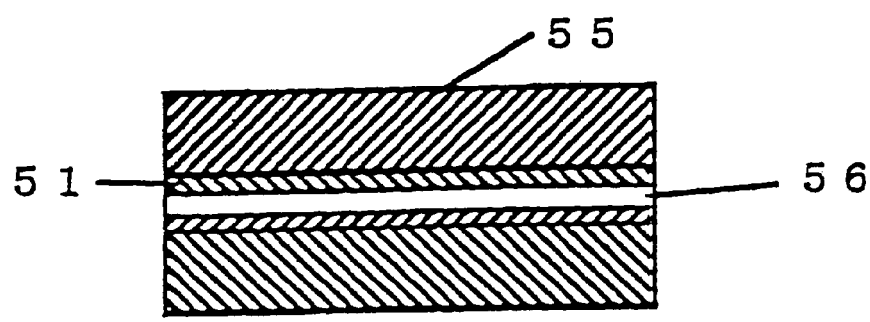
FIG. 20 is a vertical sectional view of a metal ferrule for an optical fiber according to the present invention.

The length of the metal ferrule 55 for an optical fiber is to be made appropriate according to the structure of the connector. In addition, according to the purpose, for example as shown in FIG. 20, one or both of the end faces of the metal ferrule 55 for an optical fiber of the present invention can be processed into, for example, a flat shape, a dome shape, or an angled shape. Or back-tapering of an appropriate angle can be formed on one or both of the ends of the insertion holes 56 for the optical-fiber wires, so as to facilitate the insertion of the optical-fiber wires into the insertion holes 56.

The outer periphery of the metal ferrule 55 for an optical fiber is ground so as to form a perfect circle at sub-micron precision, within ±0.5 μm to be more specific, against the center of the insertion hole 56, by NC machining and the like, as needed.

How to use the metal ferrule 55 for an optical fiber of the present invention will now be described. The metal ferrule 55 for an optical fiber according to the present invention can be used extremely advantageously for a variety of purposes where optical elements are used as parts for temporarily or permanently connecting optical fibers.

Because the outside diameter of the metal ferrules for optical fibers according to the present invention is significantly smaller than that of a conventional ferrule, it is possible to advantageously improve the mounting density of the optical fiber for various kinds of connectors, such as a plug-type connector, a jack-type connector, an adapter, and a receptacle. Also, because the eccentricity is significantly small, the optical fibers can be connected more precisely, and the loss of optical signals at the time of connecting can be reduced significantly.

Figure 21:
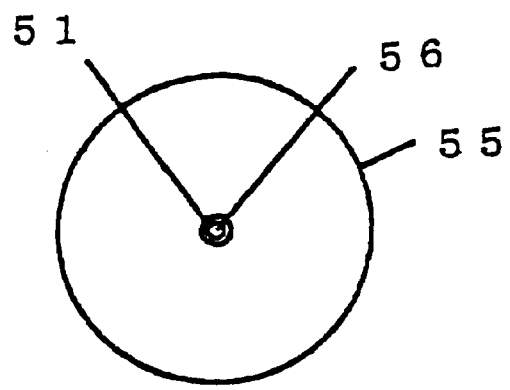
FIG. 21 is a horizontal sectional view of a metal ferrule for an optical fiber according to the present invention.
Figure 22:
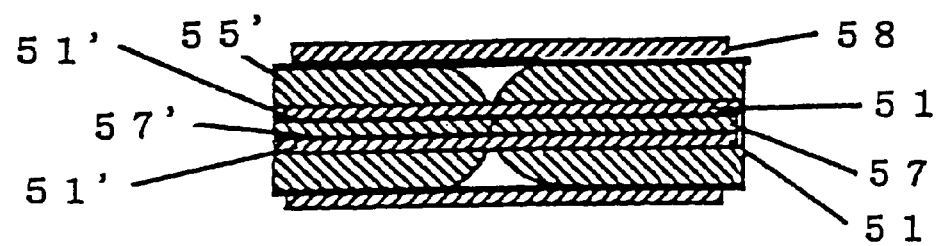
FIG. 22 is a connection diagram of a connector of a metal ferrule for an optical fiber according to the present invention.

FIG. 22 illustrates an example of a connector for PC-connecting optical fibers using a metal ferrule 55 for an optical fiber of the present invention, as illustrated in FIGS. 20 and 21. First, optical-fiber wires 57 and 57' are inserted in insertion holes 56 of metal ferrules 55 and 55' for optical fibers, and under such a condition, the end faces of the metal ferrules 55 and 55' for the optical fibers are finished into a convex spherical faces. Then, the optical-fiber wires 57 and 57', to the terminal ends of which the metal ferrules 55 and 55' are attached, are inserted in the insertion holes of the connector 58 until both tip ends of the optical-fiber wires 57 and 57' are brought into contact with each other. The optical fiber connector thus obtained can be used as it is, or it can be used by mounting, for example, a general-purpose jacket holder, a rubber holder, or an outer collar of the optical fiber connector, if needed.

In this case, the tip ends of the optical-fiber wires 57 and 57' can be ground—simultaneously with the end faces of the metal ferrules 55 and 55' for the optical fibers—into, for example, a convex spherical face, a slant spherical face, a flat face, or a slant flat face.

In order to remove the initial bubbles on a core wire and to improve wettability of the surface of the wire, the following means can be applied: (1) dipping a core wire into, and taking it out of, aqueous solution several times while managing the temperature of the solution, (2) generating large bubbles and allowing them to go out from the bottom of the core wire, (3) vibrating the core wire in the aqueous solution upward and downward, or (4) rotating the core wire at high speed.

EXAMPLES

Example 1

The surface-roughening agent to be used in thermal-spraying (product name: Sabnor; produced by Arc Techno Co., Ltd.), which is composed of epoxy resins, solvents, and curing agents, was sprayed onto the ferrules, which were fixed onto the positioning member by the method described for the above embodiment, so as to roughen the surface of each ferrule. The ferrules, which were formed into a specified shape, were coated on their surfaces (except for the sides having ferrule holes) by flame-spraying polyphenylenesulfide-base thermoplastic resin [FORTRON®; produced by Polyplastics Co., Ltd.], and each ferrule was formed into a specified shape, so that 20 connectors (each of which has 1 stage of ferrules in it) for 8-core optical fibers were manufactured.

At this time, the nozzle temperature was set at 300° C.–330° C., and the temperature near the ferrules was maintained at 150° C.–200° C. Measuring the eccentricity error (i.e., the error/difference between one ferrule hole's concentricity/direction and another ferrule hole's concentricity/direction) between the ferrule holes in the obtained connector for the 8-core optical fiber (after the connector was formed into a specified shape) revealed that the error range was ±0.05 µm–0.5 µm.

Example 2

The surface-roughening agent for thermal-spraying (Sabnor; produced by Arc Techno Co., Ltd.), which is composed of epoxy resins, solvents, and curing agents, was sprayed onto the ferrules, which were fixed onto the positioning member by the method described for the above embodiment, so as to roughen the surface of each ferrule. The surfaces of the ferrules (except for the sides having ferrule holes), which were formed into a specified shape, were coated by arc-spraying zinc wire rods and aluminum wire rods [using the Arc Boy PC 120i low-temperature metal-spraying system; Arc Techno Co., Ltd.], and each ferrule was formed into a specified shape, so that 20 connectors (each of which has 2 stages of ferrules in it) for 8-core optical fibers were manufactured.

The temperature near the ferrules during thermal-spraying was maintained at 40° C.–50° C. Measuring the eccentricity error between the ferrule holes in the obtained connector for the 8-core optical fiber (after the connector was formed into a specified shape) revealed that the error range was ±0.05 µm–0.5 µm.

Example 3

The structures, which were obtained by cutting the connectors for optical fibers manufactured by the method of Example 2 into a specified shape and adjusting the positions of the ferrules' insertion holes and the wall surface, were piled up. They were then coated by flame-spraying IDEMITSU PPS onto their surfaces (except for the sides having ferrules holes), and each ferrule was formed into a specified shape, so that 10 connectors (each of which has 4 stages of ferrules in it) for 16-core optical fibers were manufactured.

At this time, the nozzle temperature was set at 300° C.–330° C., and the temperature near the ferrules was adjusted to 150° C.–200° C. Measuring the eccentricity error between the ferrule holes in the obtained connector for the 16-core optical fiber (after the connector was formed into a specified shape) revealed that the error range was ±0.05 µm–0.5 µm.

Example 4

Aluminum wire rods and zinc wire rods, both of which were meant for thermal-spraying, were sprayed by a low-temperature metal thermal-spraying method—electric-arc spraying (Arc Boy PC 120i low-temperature metal thermal-spraying system; Arc Techno Co., Ltd.)—onto the surfaces (except for the sides having ferrule holes) of the connectors for optical fibers, which had been obtained by the methods of Examples 1 and 3.

Output voltage: 7 V–10 V

Wire-feeding speed: 3.5 m/min (Φ=1.3 mm)

Jet-air pressure: 5.5 kg/cm$^2$

Measuring the eccentricity error between the ferrule holes in the obtained connector (after the connector was formed into a specified shape) revealed that the error range was ±0.05 µm–0.5 µm.

Example 5

Electroforming using nickel with the method of the above-mentioned embodiment was performed on 50 cylindrical metal ferrules, whose arrangement was 10 rows (5 stages). The obtained structure was ground into a specified shape, and the surface-roughening agent for thermal-spraying (Sabnor; produced by Arc Techno Co., Ltd.), composed of epoxy resins, solvents, and curing agents, was sprayed on the surface of the ferrules (except for the sides having the insertion holes), so as to roughen the surface thereof. Then, flame-spraying was performed thereon, using the polyphenylenesulfide-base thermoplastic resin (IDEMITSU PPS; supplied by Idemitsu Petrochemical Co., Ltd.). The temperature of the flame-spraying was adjusted to about 300° C.–330° C. (which was the same as the temperature near the jet nozzle), and the surface temperature of said structure was adjusted to about 150° C. Measuring the eccentricity error between the ferrule holes in the obtained connector (after the connector was formed into a specified shape) revealed that the error range was ±0.05 μm–0.5 μm.

Example 6

Fifty cylindrical metal ferrules, whose arrangement was 10 rows and 5 stages, were electroformed by the method of the above embodiment. The obtained structure was ground into a specified shape, and the surface-roughening agent for thermal-spraying (Sabnor; produced by Arc Techno Co., Ltd.), which is composed of epoxy resins, solvents, and curing agents, was sprayed on the surfaces of the ferrules (except for the sides having insertion holes). Then low-temperature metal thermal-spraying was performed by electric-arc spraying (using the Arc Boy PC 120i low-temperature metal thermal-spraying system; Arc Techno Co., Ltd.), while aluminum wires and zinc wires were used as materials to be sprayed onto the surface of the ferrules.

Output voltage: 7 V–10 V
Wire-supplying speed: 3.5 m/min ($\Phi$=1.3 mm)
Jet-air pressure: 5.5 kg/cm$^2$ Measuring the eccentricity error between each ferrule hole in the obtained connector (after the connector was formed into a specified shape) revealed that the error range was ±0.05 μm–0.5 μm.

Example 7

The surface-roughening agent for thermal-spraying (Sabnor; produced by Arc Techno Co., Ltd.), composed of epoxy resins, solvents, and a curing agents, was sprayed onto the ferrules, which had been fixed onto a positioning member by the method described for the above embodiment, so as to roughen the surface of the ferrules. The ferrules were coated by flame-spraying the polyphenylenesulfide-base thermoplastic resin FORTRON®; supplied by Polyplastics Co., Ltd.] onto their surfaces (except for the sides having ferrule holes), and each ferrule was formed into a specified shape, so that connectors (each of which had 3 stages of ferrules in it) for 24-core optical fibers were manufactured. Furthermore, the periphery of the structure was ground so as to obtain a specified shape, and 3 layers of the structures, wherein the positions of the ferrule insertion holes and the wall surface were adjusted, were piled up. Then, the structures were coated by flame-spraying said FORTRON® thereon, so that 10 connectors for 72-core optical fibers were manufactured.

At that time, the nozzle temperature was set at 300° C.–330° C., and the temperature near the ferrules was adjusted to 150° C.–200° C. Measuring the eccentricity error between each ferrule hole in the obtained connector for the 72-core optical fiber revealed that the error range was ±0.05 μm–0.5 μm.

As stated above, the error range in the connector of the present invention was ±0.5 μm or less, confirming that the connector of the present invention was suitable for preventing the axial displacement of the optical fibers.

Example 8

Fifty cylindrical metal ferrules (whose arrangement was 10 rows in 5 stages) were electroformed using nickel by the method of the above embodiment. The obtained structure was ground and formed into a specified shape, and a connector (composed of electrodeposited ferrule and nickel layers) for a 50-core optical fiber was manufactured. Measuring the eccentricity error between each ferrule hole revealed that the error range was ±0.05 μm–0.5 μm.

Example 9

The surface-roughening agent for thermal-spraying (Sabnor; produced by Arc Techno Co., Ltd.), which is composed of epoxy resins, solvents, and curing agents, was sprayed onto the ferrules, which was fixed onto a positioning member by the method described for the above embodiment, so as to roughen the surface of the ferrules. The ferrules were coated by flame-spraying onto their surfaces (except for the sides having ferrule holes) the thermal-spraying material containing epoxy resins and a curing agent, and each ferrule was formed into a specified shape, so that 20 connectors (each of which had 1 stage of ferrules in it) for 8-core optical fibers were manufactured.

At this time, the temperature near the nozzle was set to 150° C., and the temperature near the ferrules was adjusted to 150° C.–200° C. Measuring the eccentricity error between each ferrule hole in the obtained connector for 8-core optical fiber revealed that the error range was ±0.05 μm–0.5 μm.

INDUSTRIAL APPLICABILITY

As described above, a connector according to the present invention is a structure obtained by (a) aligning plural cylindrical ferrules by using a precisely-adjusted positioning member and using both end holes of the ferrules as a reference points in positioning, (b) thermal-spraying or electroforming a resin or a metal onto the cylindrical ferrules at one time while the ferrules are maintained in a specified position, (c) piling up at least 2 layers of a resin or a metal on the surface of said structure, so as to form a thermal-sprayed layer thereon, and (d) piling up at least 2 layers of a resin or a metal on the surface of said structure, so as to form a thermal-sprayed layer thereon.

Therefore, with a connector of the present invention, axial displacement of the optical fibers or bending of the optical fibers will not occur, thereby preventing connection failure due to bad positioning of optical fibers.

In addition, even a ferrule whose axis is displaced will not cause any problem in carrying out the present invention as long as the circularity of the ferrule hole is not deformed. If the arrangement of the ferrules is multi-staged, it is possible to easily construct an optical system of many channels.

Inexpensive metallic pipes that are made of conductive material and whose inside diameters are suited for insertion of optical fibers therein are used in the metal ferrule for a multi-core optical fiber of the present invention. For this reason, the metal connector of the present invention is different from a conventional, nonconductive, and expensive ceramic product, or a conventional, conductive product whose production requires the additional labor of drawing a core wire out of its electrodeposited layer. Thereby, by adopting the metal connector of the present invention, the total cost can be greatly reduced due to the inexpensive materials used and the reduced labor expense.

Inexpensive metal pipes that are conductive materials and whose inside diameters are suited for insertion of optical fibers therein are used in the metal ferrule for a multi-core optical fiber of the present invention. For this reason, the metal connector of the present invention is different from a conventional, nonconductive, and expensive ceramic product, or a conventional, conductive product whose production requires the additional labor of drawing a core wire out of its electrodeposited layer. Thereby, by adopting the metal connector of the present invention, the total cost can be greatly reduced due to the inexpensive materials used and the reduced labor expense. The metal multi-ferrule for an optical fiber of the present invention can be manufactured using a cylindrical ferrule before or after cutting.

Depending on the usage, one or both of the end faces of the metal multi-ferrule for the optical fiber can be processed into a flat shape, a dome shape, or an angled shape. Or back-tapering of an appropriate angle can be formed on the inner wall of one or both of the ends of the insertion holes for the optical-fiber wires, so as to facilitate the insertion of the optical-fiber wires into these insertion holes. So, the metal multi-ferrule can be used extremely advantageously for a variety of purposes where optical elements are used as parts for temporarily or permanently connecting optical fibers.

The metal multi-ferrule for the optical fiber of the present invention can significantly improve the mounting density of optical fibers in various multi-cored connectors. In addition, the multi-core ferrule for the optical fiber of the present invention provides higher precision in connecting optical fibers, because the central axes of its core wires' insertion holes are properly arranged so that they are parallel to each other and, as a result, the loss of optical signals at the time of connecting is significantly reduced.

What is claimed is:

1. A method of manufacturing a connector, wherein thermal-spraying or electroforming is applied—using a resin or a metal—to a plurality of cylinder-shaped ferrules, under the condition that projections—which are positioned opposite each other—of a positioning member are fitted and nipped to both ends of insertion holes of the cylinder-shaped ferrules, so that each ferrule is properly positioned and the central axes are parallel to each other at specified positions, so that said plurality of cylinder-shaped ferrules are coated.

2. The method of manufacturing a connector, wherein the connector manufactured by the method described in claim 1 is formed into a specified shape, and such that the surface—except both ends—of the connector is thermal-sprayed with at least one layer of a resin or a metal so as to form a coating around the surface.

3. The method of manufacturing a connector, wherein:
   a. the connectors manufactured by the method described in claim 1 are piled up to multiple layers (to make at least 2 layers) in a specified shape,
   b. the central axes of the insertion holes in the ferrules fixed onto said connectors are parallel to each other at specified positions, and
   c. thermal-spraying with at least one layer of a resin or a metal is applied on the surface—except both ends—of said connectors so as to form a coating around said surface.

4. The method of manufacturing a connector as described in claim 1, wherein
   a. a means for fixing plural ferrules at specified positions comprises a mobile positioning-member and a stationary positioning-member, both having projections to be engaged with both ends of the insertion holes in said ferrules, and
   b. the projections of both the mobile and the stationary positioning-members are engaged with both end-holes of each ferrule so as to hold each ferrule so that each ferrule is positioned.

5. The method of manufacturing a connector as described in claim 1, wherein the thermal-spraying is performed by flame spraying or electric-arc spraying.

6. A method of manufacturing a ferrule for a multi-core optical fiber,
   wherein a method of manufacturing a ferrule for coupling optical fibers comprises an electroforming method for applying electrical current between an anode and a cathode that are dipped in an electroforming aqueous solution stored in an electroforming bath and arranged opposite to each other, and for electrodepositing an anode substance on the surface of said cathode,
   wherein a core wire composed of a metallic pipe having insertion holes whose inside diameters are suited for insertion of optical fibers into said insertion holes, is used as said cathode,
   wherein an electrodeposited layer is formed on the outer periphery of the core wire, and further,
   wherein said method includes a step for reciprocating said anode in the vertical direction at high speed at a thick metal-electrodeposited portion of the electrodeposited layer and at low speed at a thin portion of the electrodeposited layer, in a process for forming an electrodeposited layer onto said core wire so as to reduce the degree of tapering of the outer periphery of said electrodeposited layer when manufacturing the ferrule.

7. A method of manufacturing a ferrule for a multi-core optical fiber,
   wherein a method of manufacturing a ferrule for coupling optical fibers comprises an electroforming method for applying electrical current between an anode and a cathode that are dipped in an electroforming aqueous solution stored in an electroforming bath and arranged opposite to each other, and for electrodepositing an anode substance on the surface of said cathode,
   wherein a core wire composed of a metallic pipe having insertion holes whose inside diameters are suited for insertion of optical fibers into said insertion holes, is used as said cathode,
   wherein an electrodeposited layer is formed on the outer periphery of the core wire,
   wherein a coil that (a) has an axial core in common with that of said core wire, (b) has a diameter larger than the maximum diameter of the targeted electrodeposited layer, and (c) whose pitch gradually become rougher in the direction from the top end to the bottom end—is used as said anode, and further wherein the degree of tapering of the outer periphery of said electrodeposited layer is reduced for manufacturing the ferrule.

8. A method of manufacturing a ferrule for a multi-core optical fiber, wherein
  a. a plurality of core wires composed of metallic pipes—whose inside diameters are large enough so that optical fibers can be inserted thereinto—are used;
  b. projections—which are positioned opposite each other—of a fixing member are fitted to both ends of the insertion holes of a plurality of said core wires, so that both ends of the insertion holes of a plurality of said core wires are nipped by said fixing member;
  c. a cathode—to which electric current is to be applied—is made by arranging and fixing the central axes of a plurality of said core wires parallel to each other at specified positions; and
  d. optical connectors are integrally coated and formed—as an electrodeposited layer—onto the outer periphery of said core wires by an electroforming method, by applying electric current.

9. The method of manufacturing a ferrule for a multi-core optical fiber as described in claim 8, wherein
  a. plural core wires are arranged and fixed in such a way that the central axes of the core wires' insertion holes are parallel with each other at specified positions, and that the core wires are piled up as plural layers,
  b. electric current is first applied to the core wire that is at the center of all the core wires, so as to form an electrodeposited layer thereon, and wherein
  c. the current is then applied to the adjacent core wires outwardly one by one so as to form additional electrodeposited layers thereon.

* * * * *